(12) United States Patent
Dulude et al.

(10) Patent No.: US 6,310,966 B1
(45) Date of Patent: Oct. 30, 2001

(54) BIOMETRIC CERTIFICATES

(75) Inventors: Robert S. Dulude, Wellesley, MA (US); Clyde Musgrave, Frisco, TX (US)

(73) Assignee: GTE Service Corporation, Irving, TX (US)

(*) Notice: Subject to any disclaimer, the term of this patent is extended or adjusted under 35 U.S.C. 154(b) by 0 days.

(21) Appl. No.: 09/075,165

(22) Filed: May 8, 1998

Related U.S. Application Data

(60) Provisional application No. 60/046,012, filed on May 9, 1997.

(51) Int. Cl.$^7$ ............................................. G06K 9/00
(52) U.S. Cl. ............................ 382/115; 382/116; 382/232
(58) Field of Search ................................ 382/116, 115, 382/156, 232; 380/4, 23, 25, 30, 49; 705/39; 340/146.3, 5.82, 5.6, 5.65, 5.86; 341/155

(56) References Cited

U.S. PATENT DOCUMENTS

| | | | |
|---|---|---|---|
| 4,109,237 | 8/1978 | Hill | 340/146.3 E |
| 4,405,829 | 9/1983 | Rivest et al. | 178/22.1 |
| 4,641,349 | 2/1987 | Flom et al. | 382/2 |
| 4,868,877 | 9/1989 | Fischer | 380/25 |
| 5,214,699 | 5/1993 | Monroe et al. | 380/23 |
| 5,224,173 | 6/1993 | Kuhns et al. | 382/2 |
| 5,259,025 | 11/1993 | Monroe et al. | 380/23 |
| 5,263,097 | 11/1993 | Katz et al. | 382/48 |
| 5,386,104 | 1/1995 | Sime | 235/379 |
| 5,412,727 | 5/1995 | Drexler et al. | 380/24 |
| 5,428,357 | 6/1995 | Haab et al. | 341/155 |
| 5,457,747 | 10/1995 | Drexler et al. | 380/23 |
| 5,581,630 | 12/1996 | Bonneau, Jr. | 382/116 |
| 5,619,620 | 4/1997 | Eccles | 395/24 |
| 5,623,545 | 4/1997 | Childs et al. | 380/2 |
| 5,659,616 | * 8/1997 | Sudia | 380/30 |
| 5,712,914 | * 1/1998 | Aucsmith et al. | 380/30 |
| 5,841,865 | * 11/1998 | Sudia | 380/30 |
| 5,867,578 | * 2/1999 | Brickell et al. | 380/23 |
| 5,870,723 | * 2/1999 | Pare, Jr. et al. | 705/39 |
| 5,872,848 | * 2/1999 | Romney et al. | 380/49 |
| 5,930,804 | * 7/1999 | Yu et al. | 707/104 |
| 5,943,423 | * 8/1999 | Muftic | 380/4 |
| 6,012,039 | * 1/2000 | Hoffman et al. | 382/115 |
| 6,044,462 | * 3/2000 | Zubeldia et al. | 380/25 |
| 6,105,010 | * 8/2000 | Musgrave | 705/44 |
| 6,148,387 | * 11/2000 | Galasso et al. | 711/203 |
| 6,154,879 | * 11/2000 | Pare, Jr. et al. | 705/26 |

* cited by examiner

*Primary Examiner*—Matthew C. Bella
*Assistant Examiner*—Sheela Chawan

(57) ABSTRACT

Biometric identification is combined with digital certificates for electronic authentication as biometric certificates. The biometric certificates are managed through the use of a biometric certificate management system. Biometric certificates may be used in any electronic transaction requiring authentication of the participants. Biometric data is pre-stored in a biometric database of the biometric certificate management system by receiving data corresponding to physical characteristics of registered users through a biometric input device. Subsequent transactions to be conducted over a network have digital signatures generated from the physical characteristics of a current user and from the electronic transaction. The electronic transaction is authenticated by comparison of hash values in the digital signature with re-created hash values. The user is authenticated by comparison against the pre-stored biometric certificates of the physical characteristics of users in the biometric database.

10 Claims, 5 Drawing Sheets

BIOMETRIC CERTIFICATES

CROSS-REFERENCE TO RELATED APPLICATIONS

This application claims priority under 35 USC §119 of provisional application 60/046,012 filed May 9, 1997, the entire disclosure of which is hereby incorporated by reference.

BACKGROUND OF THE INVENTION

1. Field of the Invention

This disclosure relates generally to the field of secure communications, and in particular to the issuance and management of certificates for authenticating messages.

2. Description of Related Art

The use of computer networks and telecommunication systems for various transactions has markedly increased in recent years. Traditional transactions such as shopping, purchasing, banking, and investment services have experienced growth in new directions due to the application of computers and telecommunications.

While traditional transactions have heretofore been conducted typically on a person-to-person basis, many telecommunication-based transactions are conducted remotely and sight-unseen; i.e. the participants in telecommunication-based transactions may never meet.

With such telecommunication-based transactions, there is an increasing need to recognize and verify the authenticity of a remote user of electronic services, including such services involving consumers of all types of electronic transactions such as purchases over the Internet, home banking, electronic transfers of funds, and electronic brokerage services. Such electronic transactions may also involve users of remote repositories of data, for example, to access classified records, medical records, billing records, and unclassified but sensitive data, such as company records. Other relevant areas requiring adequate or even absolute security include authentication of signers of electronic documents such as contracts. In general, any electronic service of value, provided over a local network or a public network, requires authentication of the requester in order to protect the value of the service. More valuable services typically require a greater degree of authentication.

Historically, access to electronic services has been provided through identification techniques such as account names and authentication techniques such as personal identification numbers (PINs) and passwords. Such authentication techniques have not proven to be very secure since PINs and passwords are often easily guessed, hard to remember, or subject to discovery by exhaustive automated searches. Recently, digital certificates have emerged as a leading candidate for authenticating electronic transactions.

Ideally, a digital certificate, such as those defined by the X.509 and ANSI X.9 standards, allows users or buyers and sellers to authenticate electronic documents and electronic transactions in a manner analogous to the authentication of documents by a Notary Public in person-to-person transactions. The combination of cryptographic techniques, including public key cryptography, and the use of digital certificates provides greater integrity, privacy and a degree of authentication for on-line electronic transactions which instills a greater level of confidence in the electronic services consumer.

For example, such authenticating certificates in the prior art may be generated by concatenating a message and a public key with a set 10 of data as shown in FIG. 1, which may be in a sequence and which may include a subject unique ID 12 corresponding to the subject; that is, the individual or entity such as a corporation, having the public key. As shown in FIG. 1, other fields in the set 10 of data may include a version number, a serial number for the certificate with respect to a sequence of generated certificates, the name of the issuer, a validity period to determine an expiration of validity of the certificate, a subject name identifying the user or individual sending the transaction, an issuer unique ID number, and other data extensions indicating privileges and attributes of the certificate, such as access privileges.

The subject unique ID 12 of the user may include M bits representing, for example, a social security number or a password associated with the user sending the transaction. Typically, $M \approx 50$ bits$\approx$6bytes or less.

The authenticating certificate, being the concatenation of the set 10 of data with the public key and the transaction data, is then processed, for example, using a hash function such as a one-way hashing function, to generate a hashed value. The hashed value is then signed; that is, encrypted, using the private key of the user to generate a digital signature 14. The digital signature 14 is then appended to the authenticating certificate and the message, such as an electronic transaction,for transmission over, for example, a network.

The X.509 and ANSI X.9 standards described above incorporate a hash function to generate unique digital signatures 14 from a respective set 10 of data. Such one-way hashing functions enable the transaction data to be computationally infeasible to derive solely from the hash value.

While the use in the prior art of authenticating certificates incorporating digital certificates improves transactions employing electronic authentication, it still falls short of actually authenticating a human transactor, such as a consumer. Instead, such digital certificates in the prior art only authenticate the private cryptographic key used in the transaction or signature. Since private keys are physically stored on computers and/or electronic storage devices, such private keys are not physically related to the entities associated with the private keys. For example, a private key is assigned to an entity, which may be a group of people, an organization such as a company, or even groups of organizations, and so private keys are not limited to actual human individuals.

Identification indica of individuals may be subdivided into three broad categories: indica based on the physical characteristics of the individual, that is, what the individual is; indicia based on one's knowledge, such as passwords known to the individual; and indicia based on assigned information, that is, what another individual has associated with the identified individual, or what the identified individual chooses with which to be associated. The first category having physical indicia relates to the biometric data of an individual, and includes characteristic features such as genetic composition, fingerprints, hand geometry, iris and retinal appearance, etc., which are unique to each individual, with known exceptions such as the identical genetic compositions of twins.

The second and third categories having known and/or assigned indicia includes information which the individual knows and/or is charged with memorizing and divulging for authentication, such as social security number, mother's maiden name, access codes such as long distance calling card numbers, and personal passwords. The second category also includes information and/or objects which the individual owns and/or is charged with carrying and divulging for authentication, such as driver's licenses and passports.

Private keys are assigned indicia. Accordingly, the lack of physical identification of a human transactor with a private key is a flaw in authentication techniques in the prior art using such private keys. Other authentication and security techniques in the prior art are similarly flawed, since many authentication and security techniques rely on identification indicia of the second category.

Techniques are known in the art for authenticating an individual based on identification indica of the first category; that is, by physical characteristics. For example, U.S. Pat. No. 4,641,349 to Flom et al. discloses a system for performing iris recognition. Typically, such physical characteristics identifying techniques require complicated computational operations for the capture and accurate classification of physical characteristics, since such physical characteristics are unique to each individual. Accordingly, the identification indicia for such physical characteristics generally requires a relatively large amount of memory to store and classify such identification indicia.

Heretofore, the relatively large computational demands of authentication techniques based on physical characteristics has prevented such authentication techniques from being implemented in electronic transactions.

SUMMARY OF THE INVENTION

It is recognized herein that biometric identification and classification in the authentication of electronic transactions provides for increased security and accuracy.

A biometric certification system and method are disclosed herein which implements an end-to-end security mechanism binding the biometric identification of consumers with digital certificates. The biometric certification system authenticates electronic transactions involving a user, and includes a biometric input device which responds to a set of physical characteristics of the user, and generates corresponding first biometric data related to the physical condition of the user.

Biometric data is pre-stored as biometric certificates in a biometric database of the biometric certificate management system by receiving data corresponding to physical characteristics of registered users through a biometric input device. Subsequent transactions to be conducted over a network have transaction biometric data generated from the physical characteristics of a current user, which is then appended to the transaction first data, and which then authenticates the user by comparison against the pre-stored biometric data of the physical characteristics of users in the biometric database.

BRIEF DESCRIPTION OF THE DRAWINGS

The features of the disclosed biometric certification system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
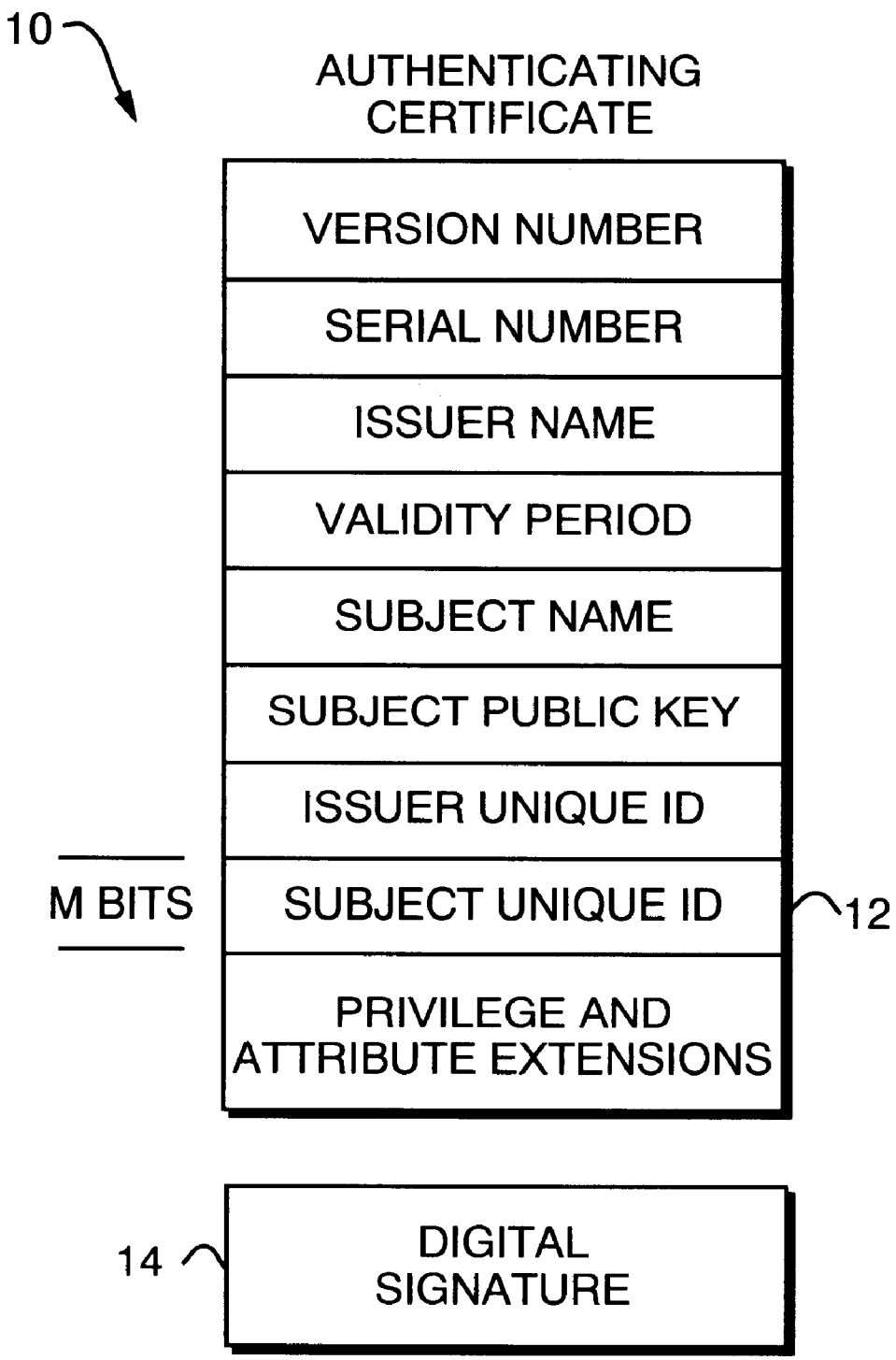
FIG. 1 illustrates an authenticating certificate in the prior art.
Figure 2:
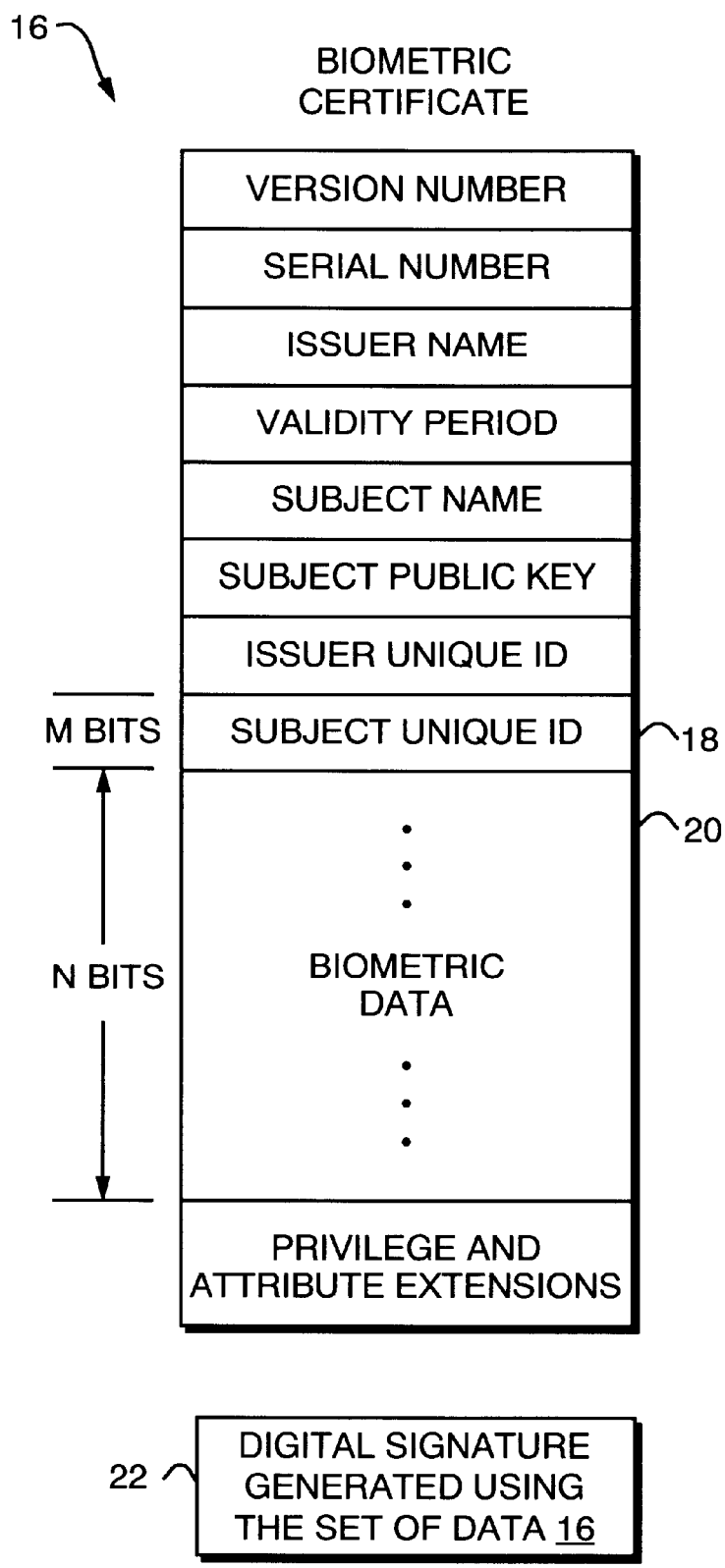
FIG. 2 illustrates a biometric certificate of the disclosed biometric certification system and method.

Referring in specific detail to the drawings, with common reference numbers identifying similar or identical elements, steps, and features, as shown in FIG. 2 the present disclosure describes a biometric certification system and method for generating biometric certificates from a set 16 of data, including a subject unique ID 18 and biometric data 20. A digital signature 22 generated using data set 16 is then appended to the data set 16 to form the biometric certificate, as shown in FIG. 2.

Figure 3:
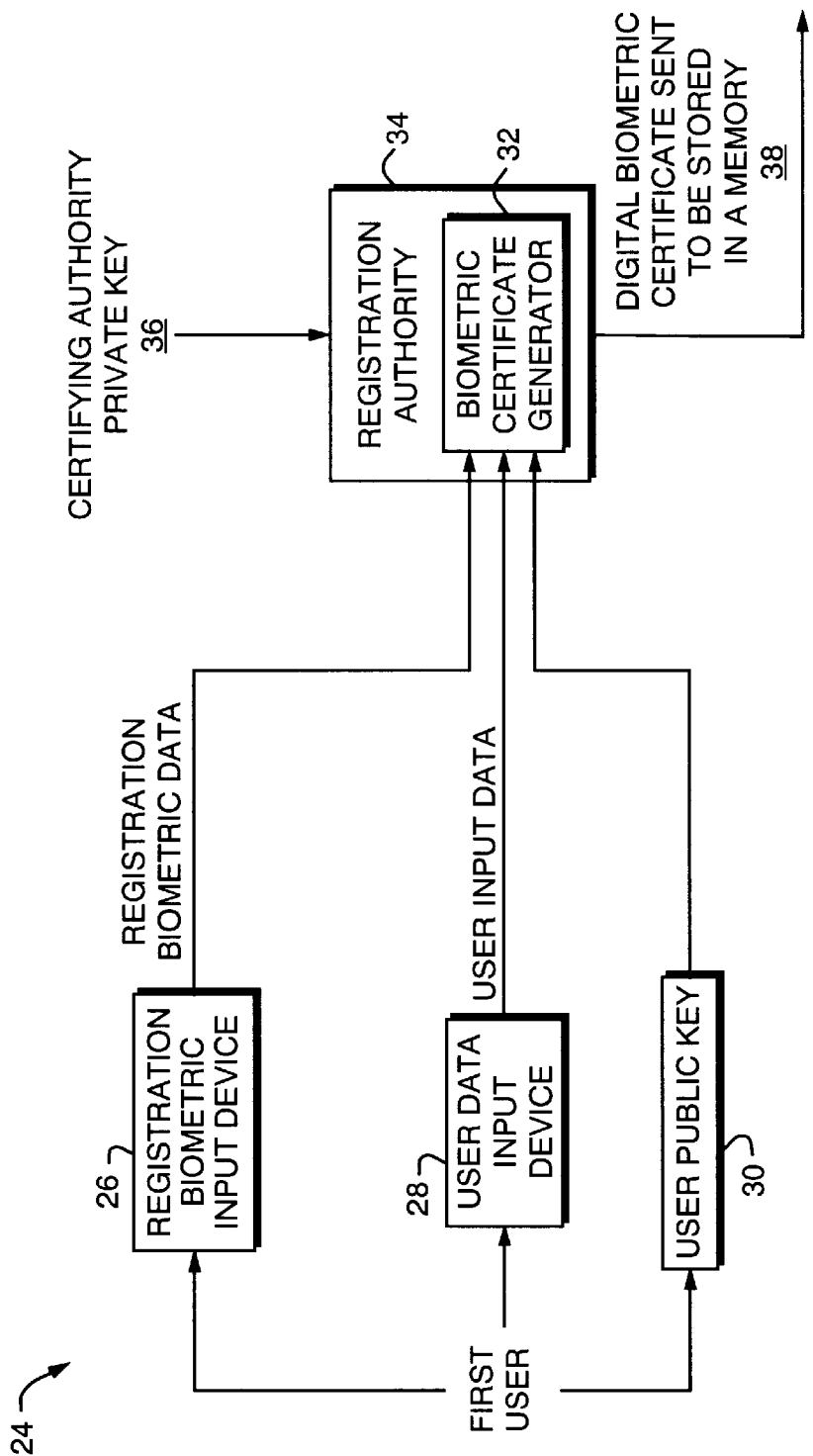
FIG. 3 illustrates a biometric certificate registration apparatus.
Figure 4:
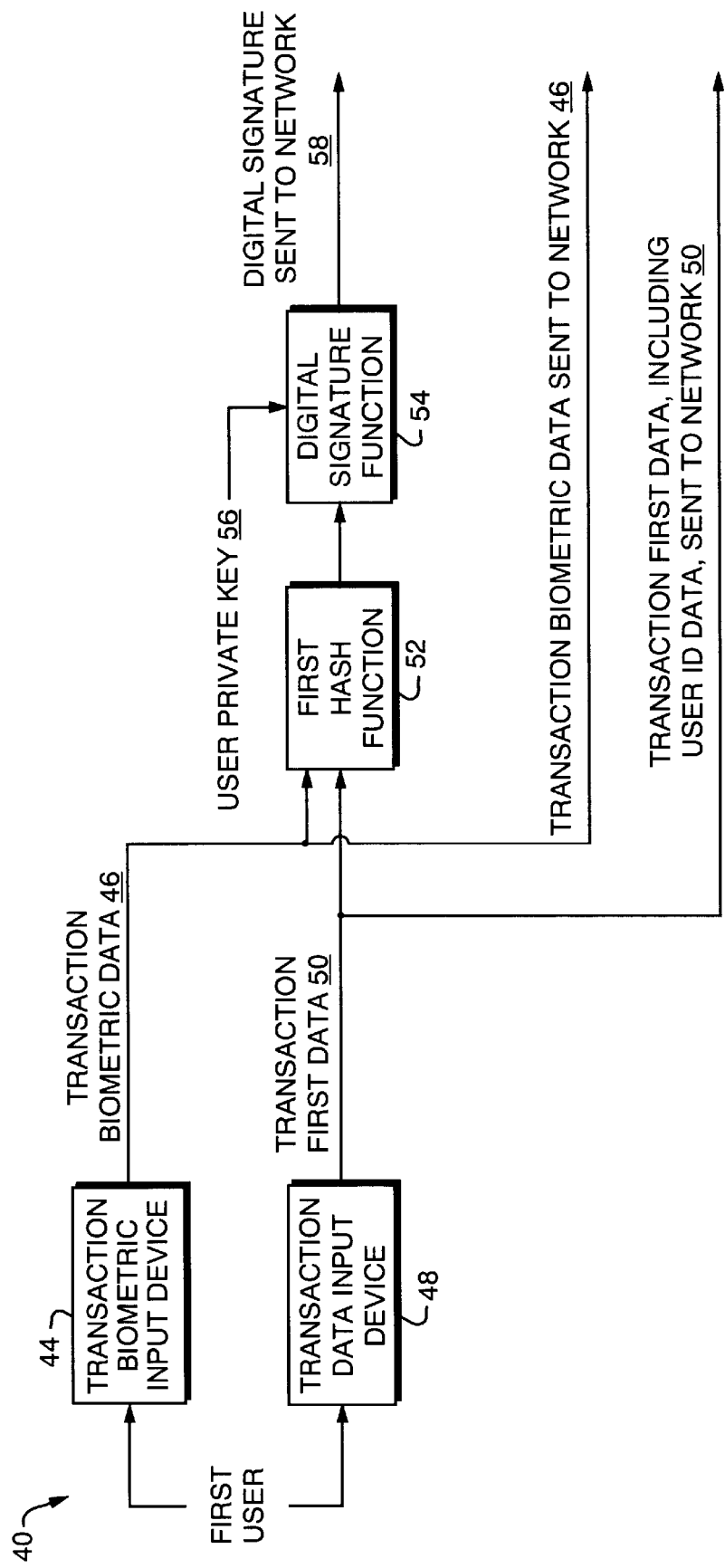
FIG. 4 illustrates an electronic transaction transmission section.
Figure 5:
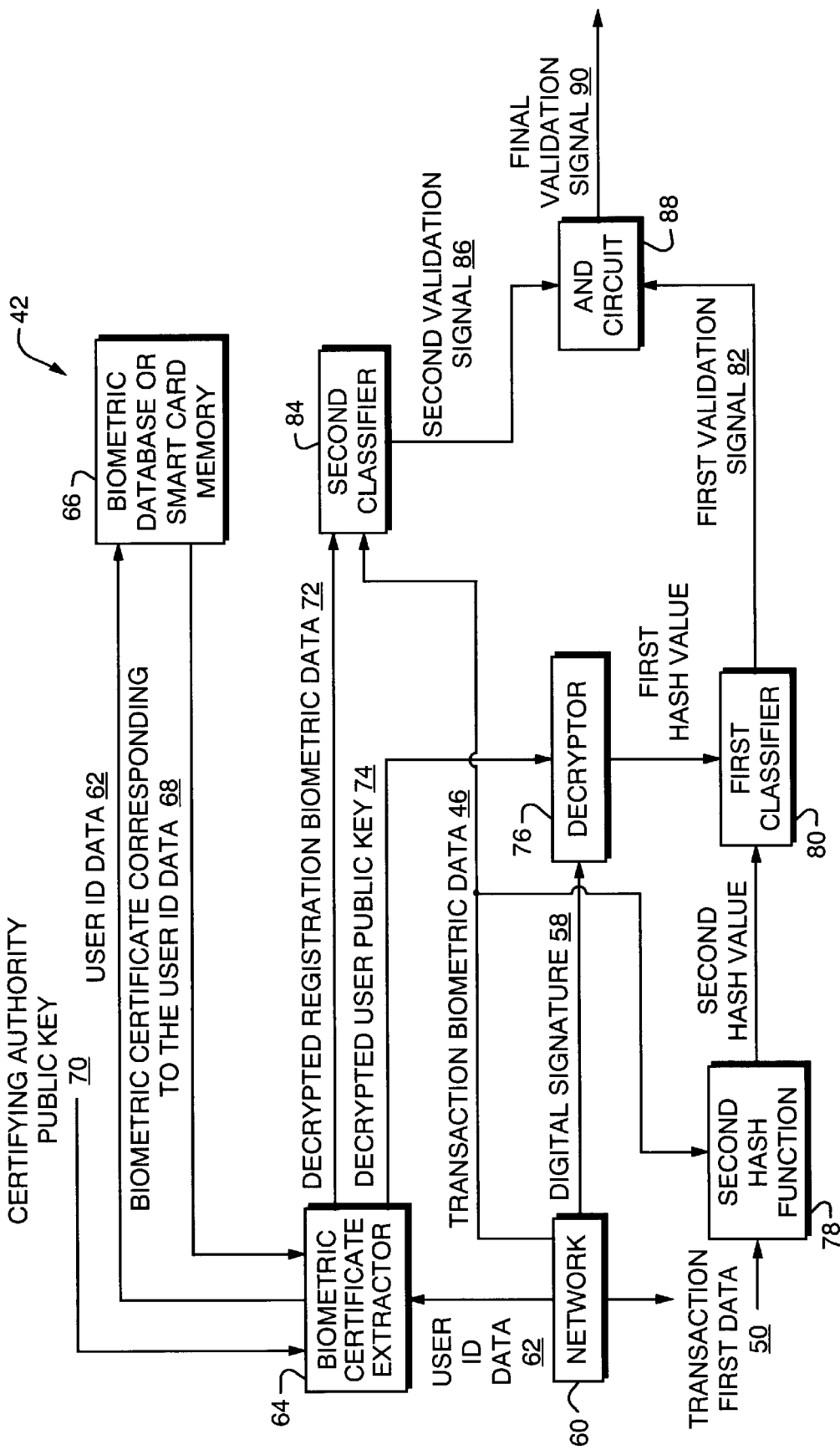
FIG. 5 illustrates an electronic transaction reception and processing section.

The disclosed biometric certification system is shown in FIGS. 3–5, having biometric registration section 24 shown in FIG. 3, a transmitting section 40 shown in FIG. 4, and a receiving section 42 shown in FIG. 5. The biometric registration section 24 processes user biometrics and associated inputs to generate biometric certificates which are unique to the user, and which are stored in a memory such as a biometric database and/or a smart card memory. Once such biometric certificates are stored, a first user may conduct biometrically-secured electronic transactions sent from the transaction transmission section 40 of FIG. 4 to the transaction reception section 42 of FIG. 5, at which the electronic transaction is authenticated and processed.

Referring to FIG. 3, the registration section 24 has a set of input devices, including a registration biometric input device 26 and a user data input device 28. The biometric input device 26 generates registration biometric data from the physical characteristics of the user, such as fingerprints, hand geometry, iris and retinal appearance, and speech patterns.

The registration biometric input device 26 may include visual cameras and/or other visual readers to input fingerprints, hand geometry, iris appearance, and retinal appearance. For example, companies such as IDENTIX, FUJITSU, and AUTHENTEC provide such equipment for reading fingerprints, while RECOGNITION SYSTEMS provides equipment to read hand geometry. EYE-DENTIFY is an example of a company which provides retinal imaging devices, while IRISCAN and SENSAR are examples of companies which provide iris imaging devices.

Alternatively, the registration biometric input device 26 may be adapted to receive audio characteristics of a user. For example, a microphone in conjunction with a speech digitizer may be used to receive and digitize speech. Such companies as BBN, T-NETIX, and ALPHA-TEL provide such equipment for receiving and digitizing speech to generate corresponding biometric data.

Biometric input devices known in the art may be used to receive other physical characteristics such as facial and body appearance via, for example, a camera, as well as the genetic composition of the user by means of genetic material gathering procedures, such as blood lancets.

The biometric certificate as shown in FIG. 2 may be generated by processing the registration biometric data from the registration biometric input device 26, processing the user input data such as a user ID from the user data input device 28, and processing the public key 30 of the user at a biometric certificate generator 32 of a registration authority 34. Such input data are processed with the private key 36 of a certifying authority to generate a digital biometric certificate 38 which is sent to the memory for storage and subsequent use to authenticate the first user and associated electronic transactions of the first user.

The registration biometric data 20 to be incorporated into the biometric certificate of FIG. 2 is obtained directly from the physical characteristics of the subject through the biometric input device 26. The subject unique ID 18 of the user may include M bits, in which typically M≈50 bits≈6 bytes or less, while the biometric data 20 typically includes much more data than the subject unique ID 18. Generally, the biometric data 20 has N bits in which N may be very large, such as about 500 bytes. In fact, the amount of the biometric data 20 is unlimited; for example, a fingerprint may be visually scanned to any resolution to obtain key fingerprint aspects which uniquely distinguish fingerprints, or alternatively to obtain data representing pixels of the entire fingerprint. Accordingly, the biometric data 20 may require large amounts of memory for storage such as 2 kB or even 4 MB. Accordingly, in the preferred embodiment, N is much greater than M.

Prior to use of the disclosed biometric certification system and method, the biometric database 66 is built using, for example, a registration process in which individuals are required to provide proof of identity; that is, identification information such as a birth certificate, a driver's license, provided to a registration authority. Once the registration authority is satisfied with such proof, the identification information is entered into the registration system 24 and biometric measurements are then taken concurrently using at least one biometric input device 26, as shown in FIG. 3.

Such stored biometric measurements form the pre-stored biometric data in the biometric database 66 which corresponds to the pre-registered individuals who have undergone the registration process described above. Accordingly, pre-registered individuals may be properly authenticated, while unregistered individuals are rejected, within the cross-over error rate.

The biometric certificates 38 are then sent to be stored in a memory, such as a biometric database or a memory of a smart card, as shown as the memory 66 in FIG. 5. The registration system 24 of FIG. 3 may be located at a central registration station associated with a network, such that the corresponding biometric certificates of a user may be directly and securely stored in the memory 66, such as a central biometric database of a network or an individual memory of a smart card of the user. Accordingly, the central biometric database as the memory 66 may serve a network of users conducting transactions, such as electronic commerce (E-commerce), over the Internet and other networks. Alternatively, a smart card of the first user having the memory 66 may pre-store the biometric certificates, such that kiosks and other devices such as terminals and automatic teller machines (ATMs) may access the memory 66 and obtain the secured biometric certificate of the first user.

Referring to FIGS. 4–5, to conduct an electronic transaction, the first user uses the transaction system 40 in FIG. 4. The first user uses a transaction biometric input device 44 to generate transaction biometric data 46 as contemporaneous biometrics associate with the first user. The first user also generates transaction first data 50 through a transaction data input device 48. For example, the transaction first data 50 may include selections of products to be purchased over the Internet, or may include electronic funds transfers through an ATM. The transaction first data 50 also includes user ID data identifying the first user and associating the first user with the remainder of the transaction first data.

Both of the transaction biometric data 46 and the transaction first data 50 are sent over the network 60 unchanged and in the clear, or optionally encrypted by additional encryption techniques known in the art, to be received by the transaction reception section 42, as shown in FIG. 5.

In addition, at the transaction transmission section 40 of FIG. 4, both of the transaction biometric data 46 and the transaction first data 50 are processed, for example, using a first hash function 52, such as a one-way hashing function, to generate a first hashed value. RSA and SHA-1 are examples of public key cryptographic methods and one-way hashing which may be used for such encryption and hashing functions. The RSA method is described, for example, in U.S. Pat. No. 4,405,829 to Rivest et al., which is incorporated herein by reference. The SHA-1 method is described, for example, in U.S. Pat. No. 5,623,545 to Childs et al., which is incorporated herein by reference.

The first hashed value is then sent to a digital signature function 54, in which the hashed value is signed; that is, encrypted, using the private key 56 of the first user to generate a digital signature 58, incorporating the first hash value. The digital signature 58 is then sent to the network 60.

The set of data transmissions constituting the transaction biometric data 46, the transaction first data 50, and the digital signature 58 may be sent as separate bitstreams and/or data packets, or otherwise may be sent together by appending the associated data sequences using a concatenator, such as an adder for bitwise adding of the data sequences. In addition, software may be used to append such data. The data 46, 50, and 58 may be sent to the network 60, which may include telephone networks, satellite communications, and/or the Internet.

Referring to FIG. 5, after receiving the electronic transaction from the network 60, the receiving section 42 sends the user ID data 62 from the transaction first data 50 to be sent to a biometric certificate extractor 64. The biometric certificate extractor 64 uses the user ID data 62 to access a corresponding biometric certificate stored in the memory 66, such as the biometric database or smart card memory. That is, if the first user had previously stored corresponding biometric certificates generated from biometric characteristics of the first user using the registration system 24 shown in FIG. 3, the biometric certificate of the first user may be indexed according to the user ID data, such as the social security number, of the first user.

The memory 66 may receive the user ID data 62, or otherwise may receive a command from the biometric certificate extractor 64 to retrieve any biometric certificate corresponding to the user ID data 62 of the first user. If none are available, the receiving section 42 may generate a rejection signal, for example, at the biometric certificate extractor 64, to indicate that no biometric certificate is available.

Accordingly, any user requesting authentication of an electronic transaction but failing to be registered; that is, to have a corresponding pre-stored biometric certificate stored in the memory 66, is not authenticated. The receiving section 42 may generate a corresponding message of non-authentication, and may also send such a message through the network 60 to the transmitting section 40 to indicate no authenticity in the transaction.

Otherwise, if a biometric certificate is available for the first user having corresponding user ID data, the biometric certificate 68 is retrieved and sent to the biometric certificate extractor 64 to decrypt the biometric certificate 68 using the public key 70 of the certifying authority. Thus, the biometric certificate extractor 64 obtains the decrypted registration biometric data 72 and the decrypted user public key 74 associated with the first user.

The decrypted user public key 74 is then sent to a decryptor to decrypt the digital signature 58 sent over the network 60 from the transmitting section 40. The decryptor 76 then extracts the first hash value which was incorporated into the digital signature 58 by the first hash function 52.

The receiving section 42 authenticates the first hash value by attempting to recreate the first hash value using a second hash function 78 which is identical to the first hash function 52 of the transmitting section 40. The second hash function 78 receives the transaction biometric data 46 and the transaction first data 50 from the network 60, which were sent from the transmitting section 40 in the clear, or optionally encrypted by additional encryption techniques known in the art. The second hash function 78 thus generates a second hash value from the same input data applied to the first hash function 52.

The first and second hash values are then compared by a first classifier 80, such as a comparator or matching routines in software, for determining a match between the first and second hash values. A first validation signal 82 is generated to indicate whether or not both independently generated hash values match.

If both match, then the receiving section 42 thus determines that both of the transaction biometric data 46 and the transaction first data 50, in combination, are authentic and have not been modified during transmission over the network 60.

In addition, the receiving section 42 determines whether the electronic transaction is indeed from the indicated user corresponding to the transaction biometric data 46; that is, transaction biometric data 46 may not be authentic, or alternatively, the decrypted user public key 74 may be a public key 74 commonly shared by a specific group of people such as employees of a specific company.

Accordingly, the receiving section 42 compares the biometric data of the first user generated during the transaction, as the transaction biometric data 46, with the registration biometric data generated at an earlier date from the first user during a registration process using the registration system 24. The registration biometric data, which is decrypted by the biometric certificate extractor 64 to be the decrypted registration biometric data 72, is applied to a second classifier 84 to be compared to the transaction biometric data 46 which is sent over the network 60 in the clear, or optionally encrypted by additional encryption techniques known in the art.

The second classifier 84 may be a comparator, or alternatively a software routine or other hardware/software devices implementing data matching techniques, for comparing the biometric data to obtain a decision value. Alternatively, the second classifier 84 may be a trained neural network and/or a fuzzy logic classifier for classifying whether or not, within an error tolerance, the sets of biometric data 46, 72 were obtained from the same individual using biometric input devices. Such classification methods for authentication of images and data sequences using neural networks are described, for example, in U.S. Pat. No. 5,619,620 to Eccles, which is incorporated herein by reference.

The second classifier 84 then generates a decision in the form of a second validation signal 86, which may be logic values corresponding to YES or NO, or TRUE or FALSE, indicating verification of the authenticity of the user sending the electronic transaction. Alternatively, the authentication decision may be a numerical value, for example, corresponding to a percentage of confidence of authenticity. The second classifier 86 may include a predetermined threshold of, for example, 98% authenticity, to be exceeded in order to proceed with the processing of the electronic transaction.

The receiving section 42 shown in FIG. 5 may respond to the validation signals 82, 86 to process the transaction first data 50, such as an on-line purchase or an electronic funds transfer. Accordingly, transaction processing systems (not shown) may also be included in the receiving section 42. Alternatively, the receiving section 42 of FIG. 5 may be coupled to external transaction processing systems.

In another alternative embodiment, the receiving section may include an AND circuit 88 shown in FIG. 5, such as a logic AND gate or other logic mechanisms, for generating a final validation signal 90 from the validation signals 82, 86. Accordingly, if and only if both of the classifiers 80, 84 determine that the transaction biometric data 46 as well as the transaction first data 50 have been sufficiently securely transmitted over the network 60, then a final validation signal 90 reflecting the security of the overall transaction is generated.

Although the first classifier 80 is a perfect classifier; that is, only an exact match of the hash values generates an authentication, the second classifier 84 may generate percentages reflecting relative authenticity and/or scaled numerical values on an authenticity scale to reflect the error tolerance of the second classifier 84 and/or the cross-over error rates associated with biometrics. Accordingly, the application of fuzzy logic may be used to generate a crisp determination of the authenticity of the transaction biometric data 46 as the second validation signal 86.

Using biometric certificates, cross-over error rates for identification and authentication may be below about 2.0%, and may even be also low as about 0.5%. The application of more advanced biometric input devices 26, 44 and classifiers 80, 84 known in the art may obtain substantially perfect authentication of any individual from the global population.

The disclosed biometric certification system and method may include electronic transactions using a network as described in commonly assigned U.S. patent application Ser. No. 08/770,824, filed Dec. 20, 1996 and entitled "VIRTUAL CERTIFICATE AUTHORITY, which is incorporated herein by reference. Such a system can be adapted to include the use of biometric certificates as described herein for cryptographically binding the biometric data of a user with identification information to form such biometric certificates. The use of public key technology allows the transaction/signature authentication process to be done either centrally or remotely, depending upon the needs of the transaction.

While the disclosed biometric certification system and method is particularly shown and described herein with reference to the preferred embodiments, it is to be understood that various modifications in form and detail may be made therein without departing from the scope and spirit of the present invention. Accordingly, modifications, such as any examples suggested herein, but not limited thereto, are to be considered within the scope of the present invention.

What is claimed is:

1. A method for authenticating an electronic transaction involving a user, comprising the steps of:
   registering a user, including the steps of:
   receiving a registration set of physical characteristics of the user at a biometric input device;
   generating registration biometric data corresponding to the registration set of physical characteristics;
   generating a biometric certificate from the registration biometric data, user input data, a public key of the user, and a digital signature; and
   storing the biometric certificate in a biometric database;
   transmitting an electronic transaction over a network, the electronic transaction including transaction biometric data, transaction first data, and a digital signature generated from the transaction biometric data and the transaction first data, the step of transmitting including the steps of:
  receiving a current set of physical characteristics of the user;
  generating the transaction biometric data from the current set related to the physical condition of the user;
  generating a first hash value signal from the transaction first data and the transaction biometric data;
  generating the digital signature from the hash value and a private key signal of the user;
  transmitting the digital signature over the network; and
  transmitting the transaction biometric data and the transaction first data over the network; and
authenticating the electronic transaction, including the steps of:
  receiving the digital signature, the transaction biometric data and the transaction first data from the network;
  retrieving user identification (ID) data from the transaction first data;
  retrieving a biometric certificate, corresponding to the user ID data, from the biometric database;
  extracting the registration biometric data and the user public key from the biometric certificate;
  decrypting the digital signature using the user public key to retrieve the first hash value from the digital signature;
  generating a second hash value from the transaction biometric data and the transaction first data;
  comparing the first hash value to the second hash value using a first classifier;
  generating a first validation signal to authenticate the transmission of the transaction first data and the transaction biometric data based on the comparison by the first classifier;
  comparing the registration biometric data and the transaction biometric data using a second classifier; and
  generating a second validation signal to authenticate the user based on the comparison by the second classifier.

2. The method of claim 1, wherein the step of authenticating further comprises the step of:
  ANDing the first and second validation signals.

3. The method of claim 1, wherein the step of receiving a registration set of physical characteristics of the user includes the step of:
  receiving visual characteristics of the user using a visual reader as the biometric input device.

4. The method of claim 1, wherein the step of receiving a registration set of physical characteristics of the user includes the step of:
  receiving speech characteristics of the user using a speech digitizer as the biometric input device.

5. The method of claim 1, wherein the step of generating the registration biometric data includes the step of:
  generating a bit sequence greater than about 500 bytes in length as the registration blometric data.

6. A system for authenticating an electronic transaction involving a user, comprising:
  a registration section configured to register a user by receiving a registration set of physical characteristics of the user at a biometric input device, generating registration biometric data corresponding to the registration set of physical characteristics, generating a biometric certificate from the registration biometric data, user input data, a public key of the user, and a digital signature, and storing the biometric certificate in a biometric database;
  a transmission section configured to transmit an electronic transaction over a network, the electronic transaction including transaction biometric data, transaction first data, and a digital signature generated from the transaction biometric data and the transaction first data, the transmitting section receiving a current set of physical characteristics of the user, generating the transaction biometric data from the current set related to the physical condition of the user, generating a first hash value signal from the transaction first data and the transaction biometric data, generating the digital signature from the hash value and a private key signal of the user, transmitting the digital signature over the network, and transmitting the transaction biometric data and the transaction first data over the network; and
  an authentication section configured to authenticate the electronic transaction by receiving the digital signature, the transaction biometric data and the transaction first data from the network, retrieving user identification (ID) data from the transaction first data, retrieving a biometric certificate, corresponding to the user ID data, from the biometric database, extracting the registration biometric data and the user public key from the biometric certificate, decrypting the digital signature using the user public key to retrieve the first hash value from the digital signature, generating a second hash value from the transaction biometric data and the transaction first data, comparing the first hash value to the second hash value using a first classifier, generating a first validation signal to authenticate the transmission of the transaction first data and the transaction biometric data based on the comparison by the first classifier, comparing the registration biometric data and the transaction biometric data using a second classifier, and generating a second validation signal to authenticate the user based on the comparison by the second classifier.

7. The system of claim 6, wherein the authentication section is further configured to AND the first and second validation signals.

8. The system of claim 6, wherein the registration section is configured to receive visual characteristics of the user using a visual reader as the biometric input device.

9. The system of claim 6, wherein the registration section is configured to receive speech characteristics of the user using a speech digitizer as the biometric input device.

10. The system of claim 6, wherein the registration section is configured to generate a bit sequence greater than approximately 500 bytes in length as the registration biometric data.

* * * * *